United States Patent [19]
Schlagel

[11] 3,952,864
[45] Apr. 27, 1976

[54] CONVEYOR SAFETY DEVICE

[75] Inventor: William A. Schlagel, Coon Rapids, Minn.

[73] Assignee: Schlagel, Inc., Cambridge, Minn.

[22] Filed: Dec. 5, 1974

[21] Appl. No.: 529,917

[52] U.S. Cl. .............................................. 198/232
[51] Int. Cl.² ......................................... B65G 43/00
[58] Field of Search ........................... 198/208, 232

[56] References Cited
UNITED STATES PATENTS

| | | | |
|---|---|---|---|
| 1,717,359 | 6/1929 | Aldrich | 198/208 |
| 2,600,273 | 6/1952 | Seifried | 198/208 |
| 3,066,789 | 12/1962 | Schmeck et al. | 198/208 |
| 3,419,127 | 12/1968 | Yost | 198/208 X |
| 3,757,925 | 9/1973 | Luther | 198/232 |

FOREIGN PATENTS OR APPLICATIONS

| | | | |
|---|---|---|---|
| 894,775 | 4/1962 | United Kingdom | 198/232 |
| 793,229 | 4/1958 | United Kingdom | 198/208 |

Primary Examiner—Robert J. Spar
Assistant Examiner—James M. Slattery
Attorney, Agent, or Firm—James R. Cwayna

[57] ABSTRACT

A detector unit for mounting on conveyors for automatic shut off of the drive portion of the conveyor which includes a detection and control device attachable to the tail or idler sprocket of the conveyor such that if the tail sprocket is moved forwardly, the detector will trip a switching control mechanism to shut down the drive portion of the conveyor and further, if the chain should break, the detector is provided with an automatic return mechanism to trip the switching control mechanism to again shut down the drive portion of the conveyor. The detector basically includes a movable tail sprocket assembly having a first range of adjustable movement and having a detector arranged to move with the sprocket over the adjustable range of movement such that when the sprocket is shifted beyond this adjustable movement area the switching control mechanism will be tripped to shut off the driving portion of the conveyor.

8 Claims, 6 Drawing Figures

CONVEYOR SAFETY DEVICE

FIELD OF THE INVENTION

The field of the invention is related to conveyor motion detecting devices such that should the flights or the chain of the conveyor either be overloaded or broken, the driving portion of the conveyor will be deenergized.

BACKGROUND AND OBJECTS OF THE INVENTION

In the conveying of various materials and in the conveyors constructed therefore, the most vulnerable device in the conveyor is the flight attachment. If a foreign object is lodged in the conveyor in such a way that it is placed in the path of a flight, it would be possible for the conveyor to continue to run and damage all the flights on the conveying chain. Additionally, if a foreign object is carried into the head sprocket or driving sprocket of the conveyor, it could break the chain, throw it off the sprocket, or break the sprocket.

Several methods have been utilized in the past to detect these problems. These methods have met with minimal, if any, success. Some of these previous methods include zero speed detectors, motor load detectors, and proximity detectors.

A zero speed detector requires a device located on the tail or idler sprocket that will respond to a condition wherein the sprocket shaft has stopped revolving. If the flights or material carrying devices of the conveyor are being damaged and the chain continues to run without a break, this type of speed detector will not reveal such a problem. Further, if there is a chain break just behind the drive sprocket on the slack side, the tail sprocket will continue to revolve while the possibility of chain accumulation or "snow balling" around the drive sprocket exists.

The ineffectiveness of a load detector on the drive can be easily realized when one considers the varying loads presented to the drive during normal operation. A conveyor may be empty, partially full, or completely full at any time, thus requiring chain pull over a wide range. If a foreign object were situated in the conveyor, the flights could be damaged and the load detector would only consider this to be a normal loading.

Proximity detectors have problems similar to the zero speed detector in that damage may occur many feet before it becomes apparent to the detector device.

With applicant's device all of these various problems are overcome.

With applicant's safety device, a certain degree of latitude is provided for initial take-up and tensioning of the chain being utilized. Past the degree of this adjustment situation, the detector and switching control mechanism will come into operation such that should the tail sprocket be moved forwardly the detector will activate the switch to de-energize the driving portion of the conveyor and likewise, should the chain break, and the tail sprocket, being spring loaded, be moved rearwardly, the detector will, through the switch de-energize the driving portion.

It is therefore an object of applicant's invention to provide a detector unit for use with conveyor devices which will sense the load being placed upon an idler or tail sprocket of the conveyor and will control the driving portion of the conveyor in response to movement of the idler sprocket.

It is a further object of applicant's invention to provide a conveyor safety mechanism which includes means for mounting an idler sprocket of the conveyor with means for permitting limited movement of the idler sprocket before actuation of a detection unit which detection unit is arranged to control the drive mechanism of the conveyor such that the drive mechanism of the conveyor will be de-energized on a predetermined movement of the idler sprocket portion.

It is still a further object of applicant's invention to provide a safety detection device for a conveyor system wherein the detection device will provide a means to determine any abnormal load upon the flights of the conveyor or will determine chain breakage of the conveyor and will thereupon de-energize the driving portion of the conveyor.

It is still a further object of applicant's invention to provide a safety detection device for a conveyor mechanism which includes a first positioning arrangement for an idler or tail sprocket of a conveyor and which will provide a pre-load arrangement for the conveyor structure which will normally control the drive portion of the conveyor over a proper and normal driving load for the same.

These and other objects and advantages of applicant's invention will be further illustrated in the accompanying drawings wherein numbers are used to designate various aspects of the invention and in which.

Figure 1:
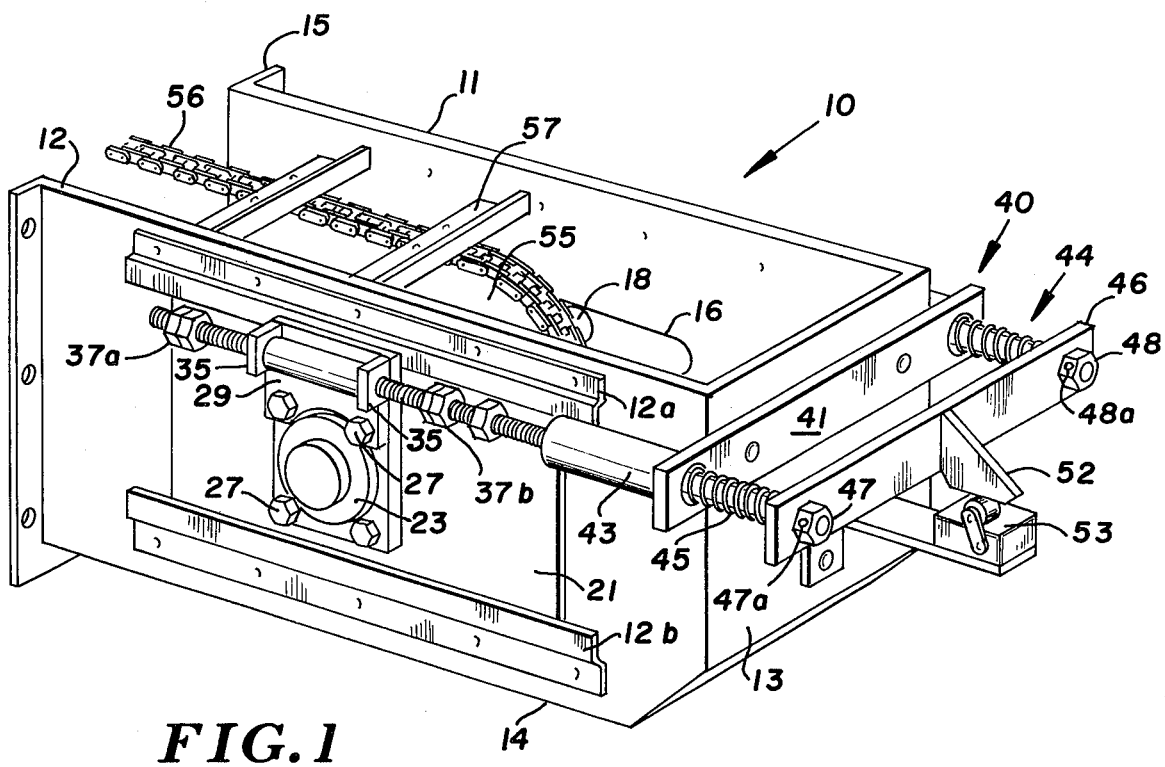
FIG. 1 is a perspective view of a conveyor attachment mechanism which embodies the concepts of applicant's detector device therein and which is attachable to a conveyor system.

In accordance with the accompanying drawings, applicant has provided a complete conveyor attachement device for the detection of chain breakage, stretching or material loading factors generally designated 10 which is provided with upstanding sides 11, 12, an upstanding rear portion 13, and a bottom portion 14 to provide a unit which is attachable to the last trough of the existing conveyor through a flange 15 provided on the forward ends of the sides 11, 12 and bottom 14. Obviously this detector section 10 must be of a size to be compatible with the existing conveyor unit and conveying chain therein.

Sides 11, 12 are provided with longitudinally extending slots 16, 17 of a length to permit certain adjustable movement of the sprocket carrying shaft 18 therein for proper tensioning of a chain and to also provide the necessary detector movement for tripping of the detector circuitry. The particular length of these slots 16, 17 will depend upon the particular pitch of the chain being utilized. The slots allow the chain to be adjusted by removal or addition of links. It is important however, that no matter what pitch of chain is being utilized that the slots be at least a selected amount longer that the chain adjustment facility as will become evident from further description of the invention.

A pair of bearing slide housings 11a, 11b, 12a, 12b are arranged in vertically spaced relation on each side 11, 12 of the unit 10 and these housings are substantially L-shaped in configuration with one side thereof being firmly attached to the respective side 11, 12 of the unit with the other portion thereof being spaced slightly therefrom to slidably contain a bearing mounting plate 20, 21 therein and to permit the same to be shifted longitudinally with respect to the unit 10.

A pair of bearing capturing elements and therefore ultimate shaft capturing elements are designated 22, 23 and are secured to the bearing mounting plates 20, 21 generally centrally thereof for the housing of bearings 24, 25 therein which bearings 24, 25 are obviously designed to receive the sprocket shaft 18 therein and permit the same to rotate therein. Obviously, means such as capturing bolts 27 are provided for holding these bearing capturing elements onto the bearing mounting plates 20, 21.

Arranged at the upper ends of the bearing capturing elements 22, 23 and secured thereto through the aforementioned attachment bolts 27 are plate members 28, 29 which serve as a means for adjustably moving the bearing mounting plates 20, 21 and thus the bearing capturing elements 22, 23. This plate, in the form shown, is of the same width as the bearing capturing elements 22, 23 and in the particular form shown, a generally cylindrical tubular member 30, 31 is positively held to this mounting bracket 28, 29 through welding or the like such that threaded adjustment shafts 32, 33 may pass therethrough. Arranged on the respective ends of this generally cylindrical member 30, 31 are a pair of square shouldered threaded elements designated 34, 35, the same designation being used for each such pair as these threaded elements are identical. The concept of utilizing such a square element is that the same will abut with the mounting plates 28, 29 and will not rotate upon rotation of shafts 32, 33. Obviously it would be possible to utilize this same concept by threading the cylindrical members 30, 31. These pairs of threaded elements 34, 35 will serve to properly position the entire bearing plate and thus the shaft 18 in proper position within slot 16, 17 for pretensioning the chain of the conveyor.

As illustrated, a jam nut or pairs of nuts in locked position are provided on each of the adjustment rods. These pairs are designated 36a, 36b and 37a and 37b. These lock nuts are designed to permit proper chain tensioning and they will abut with the bearing housing assemblies should the chain be either too short or too long. These nuts are established with proper spacing such that the entire bearing assembly and the shaft 18 may be shifted within the slots 16, 17 for proper tensioning of the chain between these nut pairs and still allow detector actuation.

A spring loaded housing assembly is provided on the rear side 13 of the unit and this entire housing assembly is designated 40. This housing includes a first mounting bar 41 extending transversely across the width of the unit and is provided with a pair of forwardly directed spring housing chambers 42, 43 thereon. These spring housing chambers 42, 43 are, as illustrated in FIG. 3, cylindrical in shape with a stop shoulder 42a, 43a thereon for holding a spring 44, 45 therein and to allow the same to extend therefrom to abut with a second bar 46 again extending transversely across the device such that the aforementioned shafts 32, 33 will extend through the spring housing chambers 42, 43 outwardly therefrom and through the bar 46 where they are provided with an internal shoulder 32a, 33a which will abut with the bar 46, and have a portion extending therethrough which is firmly affixed to a nut or other shaped member 47, 48 which member is pinned to the shafts 32, 33 as with pins 47a, 48a such that upon rotation of this nut or shaped member, the shaft 32, 33 will rotate therewith.

An additional stop member 49, 50 is provided on each of the threaded rods 32, 33 which, stop members 49, 50 are brought into abutting arrangement with the stop shoulder ends 42a, 43a of the spring housings 42, 43 when the bearing housing and thus the threaded rods 32, 33 are moved rearwardly.

Figure 3:
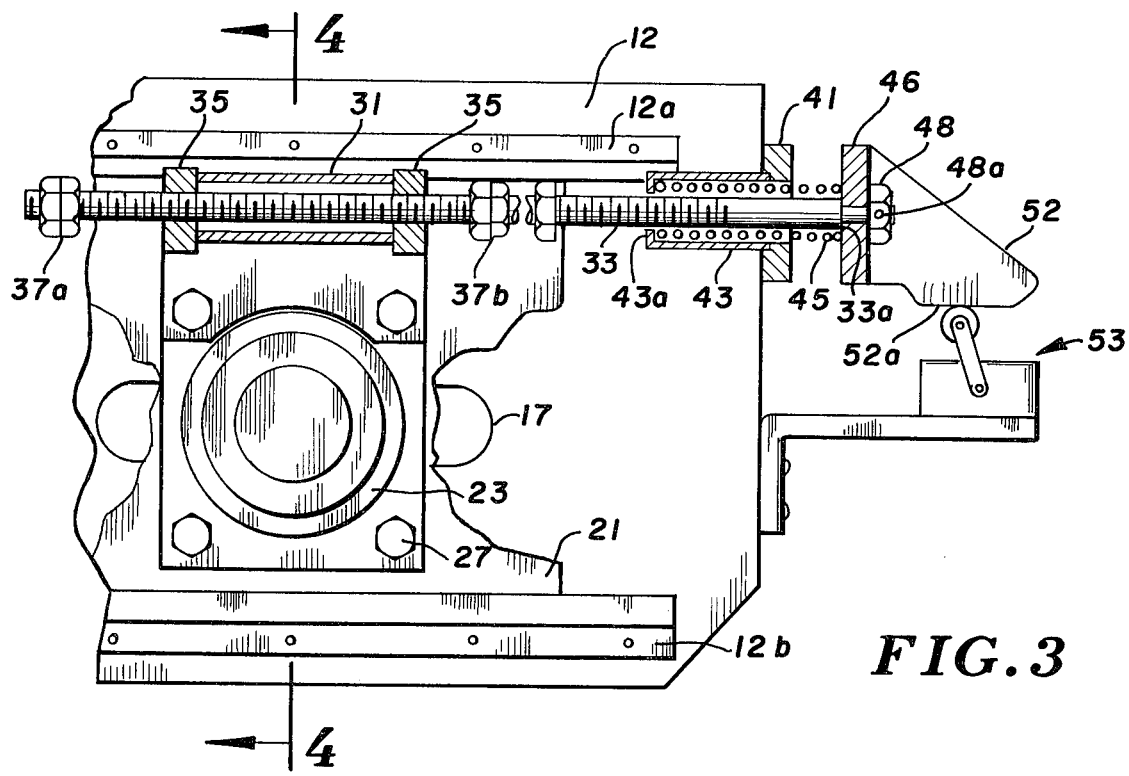
FIG. 3 is a vertical section taken substantially along Line 3—3 of FIG. 2 with portions thereof broken away for clarity.
Figure 4:
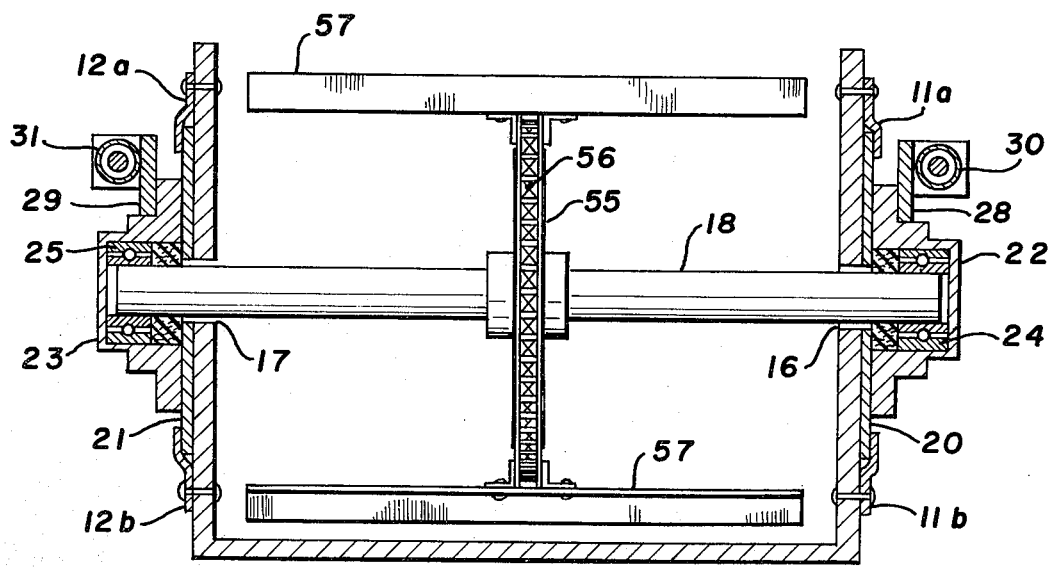
FIG. 4 is a vertical section taken substantially along Line 4—4 of FIG. 3.
Figure 5:
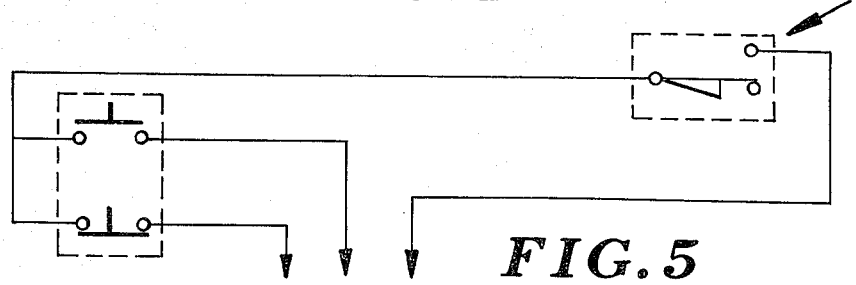
FIG. 5 is a schematic drawing illustrating the electrical control components utilized in applicant's device and, FIG. 6 illustrates a typical conveyor embodying the detection unit of applicant's invention mounted thereon.

Arranged generally centrally of the second mentioned bar member 46 is a cam 52 which has a camming surface as best illustrated in FIG. 3. This camming surface provides a normally operative open connection of microswitch 53 arranged therebelow and controlled by the camming surface 52a. The obvious operation of the circuitry as illustrated in FIG. 5, is to control the drive motor for the chain of the unit and should the microswitch element 53 be permitted to shift from its normally open position as illustrated in FIG. 5 through the action of the same upon the camming surface 52a the driving unit for the conveyor will stop. Through applicant's design of the device the unit is provided to permit the chain to move in a rearwardly direction, in the drawings, to the right, a distance twice the distance that the same is allowed to move forwardly or to the left. The concept of this multiple is to permit the take up of a certain amount of chain stretch, but after the chain stretch becomes too great, the conveyor driving mechanism will be shut down and the chain must be reset.

Figure 2:
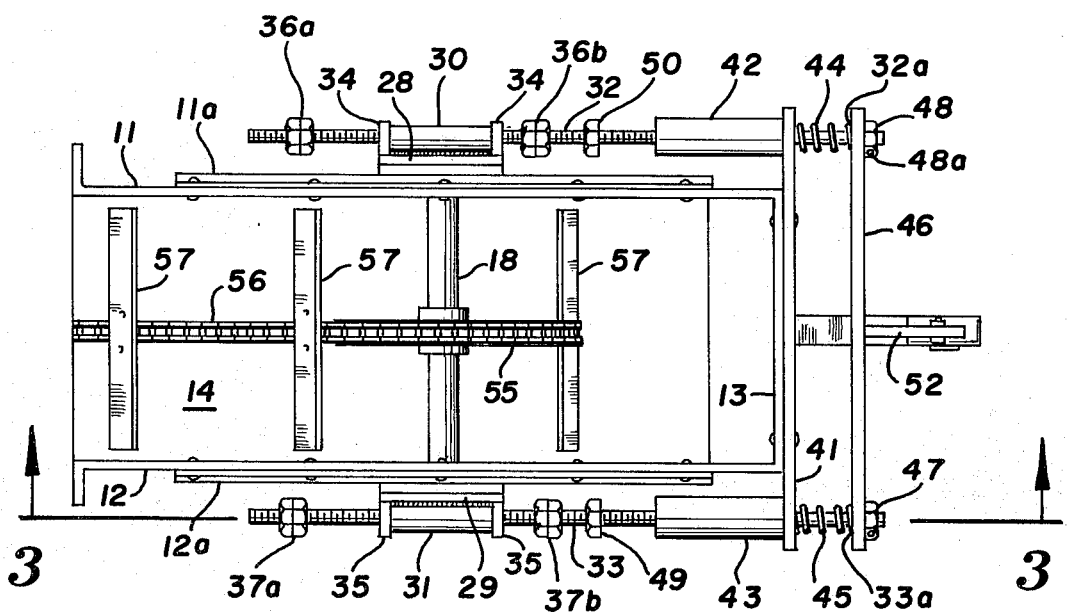
FIG. 2 is a top plan view taken substantially from FIG. 1.

With applicant's particular device, a cross section of the chain is best illustrated in FIGS. 2 and 3. In the form shown, a central sprocket 55 is provided and the chain 56 is provided to drive around this central sprocket. The shaft 18 is on an idler sprocket and the powering for the unit is arranged through the head sprocket on the other end of the conveyor. In applicant's device, a number of flights 57 are arranged on the chain and extend transversely outwardly therefrom.

The initial set up of applicant's device is to provide an initial spring load or compression of springs 44, 45 to a predetermined level. During this initial compression loading, the stop nuts 49, 50 will abut with the ends 42a, 43a of the spring housing devices. When the unit is installed into a conveyor system and the sprocket 55 and chain 56 is installed therearound, an initial adjustment of the bearing housings and shaft 18 and thus the sprocket 55 and chain 56 is obtained through rotation of the threaded rods 32, 33. Such rotation will cause the bearing housings 22, 23 to move forwardly or rearwardly thus providing the chain adjustment. If this adjustment would cause the bearing housing threaded elements 34, 35 to abut with the stop nuts 36a, 36b, 37a, 37b, then the chain must be adjusted through addition or removal of links.

The bearing housings, 22, 23 and then shaft 18 and chain 56 are provided a degree of adjustability by means of the threaded rods 32, 33 between the stop nuts and the ends of the slots 16, 17. Once the slackness of the chain 56 is removed and the sprocket 55 cannot be moved rearwardly, the threaded rods 32, 33 are again rotated until the camming surface 52a is in proper actuating registration to microswitch 53. This rotation of rods 32, 33 will draw bar 46 toward the conveyor unit thus compressing springs 44, 45. The unit is so designed and the springs so calculated that the positioning of the camming surface 52a over the microswitch 53, through rotation of the rods 32, 33 will place a pre-load upon the springs 44, 45 which will permit the same to absorb what may be termed normal loading of the conveyor but prevent abnormal loading thereof and which will provide a reaction for stretching or breakage of the chain.

In operation, if an abnormal force attempts to stop the movement of the top flight of the chain or enough force is provided to break the transversely extending wings of the chain to thus keep the chain from continuing its upper flight rearward movement, this will draw the tail sprocket assembly 55 and the shaft 18 forwardly thus causing the microswitch 53 to fall from the camming surface 52a and will cause the head or driving sprocket to be de-energized. If, on the other hand, the chain should break or sufficient chain slippage would occur, the pretension springs 44, 45 will cause the shaft 18 and the threaded rods 32, 33 to be forced rearwardly again causing the microswitch 53 to fall from the camming surface 52a. This, again, would de-energize the driving unit for the conveyor.

One additional consideration should be made. During initial operation, the chain will stretch. This will result in the shaft 18 moving rearwardly due to the spring preload bar 46 moving rearwardly thus shifting the microswitch 53 from the camming surface 52a. This will result upon sifficient chain stretch accumulation. This will again shut off the conveyor requiring re-adjustment before re-initiating its operation.

Figure 6:
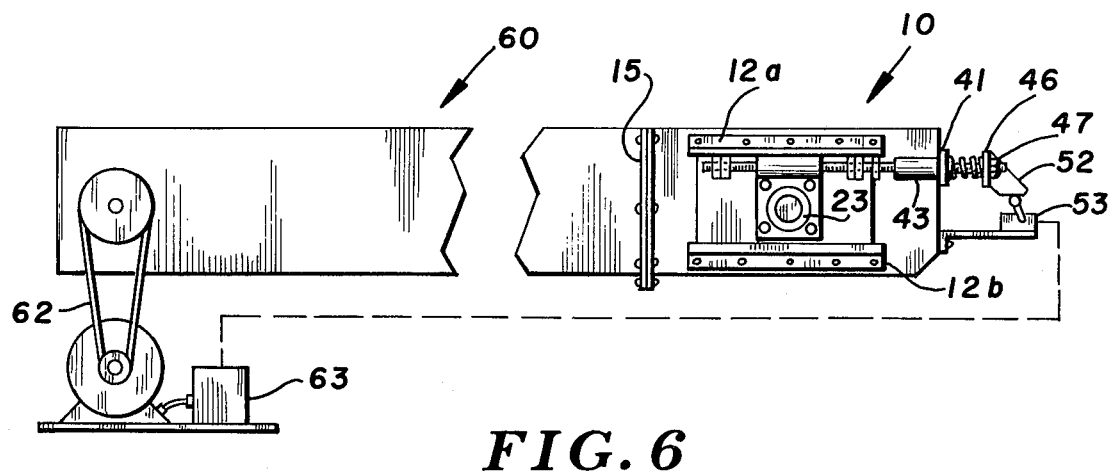

A typical installation of applicant's device is illustrated in FIG. 6. Applicant's unit may be adapted to be mounted and is shown mounted on the end of a longitudinally extending conveyor 60 through an appropriate connective flange 15 which will permit joinder of the units. The conveyor, as would be understood by those skilled in the art, will include a drive means 62 for driving the head sprocket of the conveyor and such a drive device 62 will normally be provided with an off-on control 63. This off-on control, depending upon the powering means is controlled through switch 53 of applicant's unit as the same is controlled by cam 52 moving in conjunction with the tail sprocket of the unit. The driving mechanism 62 may take many different forms and the control thereof will be linked, through accomodating mechanisms, to the control switch 53 without departing from the scope of the invention.

A concept of applicant's device is to provide a mechanism which will allow a certain amount of limited forward and a certain amount of limited rearward movement of a tail sprocket of a conveyor. Although the applicant has suggested certain possible situations where this movement could occur, it should be obvious that various other problems could result in conveyor operations that would result in this same tail sprocket movement and applicant has provided for the detection thereof through the cam device which moves with the tail sprocket and the utilization of his microswitch arrangement to control the actual driving portion of the conveyor. It should also be obvious that the configuration of the slots which permit shaft movement, the stop nuts which will determine pre-adjustment of the bearing housings in coordination with these slots and the pre-loading of the spring mechanisms of the unit must all be properly designed for the size of the conveyor being utilized.

A further aspect of applicant's invention is its use as a chain take up assembly. For use as a take up assembly the detector unit is not required. The unit is perfectly operable without the detector mechanism as an initial take up unit and during operation as an automatic tension maintaining unit.

Although the applicant has utilized and has illustrated his invention in conjunction with a single chain type device having transversely directed flighting or material carrying systems, it should be obvious that this same device could be co-ordinated with a multiple chain mechanism without departing from the scope of the invention. The basic scope of the invention is to detect the movement of the idler sprocket while allowing a certain degree of adjustability therefore and wherein after the idler sprocket has moved a certain distance, that the unit, whether a single chain unit or a composite type conveyor, will be de-energized to prevent damage to the device.

What I claim is:

1. A detection and control unit for a continuous conveyor, which conveyor includes a supporting frame, a continuous material conveying member, a drive sprocket at one end of the conveyor and a controllable driving mechanism for driving the drive sprocket, said unit including:
   a. a housing having generally upstanding sides, attachable to the supporting frame of the conveyor at a first end thereof;
   b. a transversely extending shaft in said housing arranged and constructed for mounting at least one idler sprocket thereon for carrying the conveying member;
   c. a pair of bearing members arranged on said sides of said housing, rotatably receiving the ends of said shaft and being shiftable along said housing for adjusting the tension on the conveying member;
   d. a loading and control assembly arranged on the second end of said housing and including;
      1. a first mounting member on each side of said housing;
      2. a pair of connecting rods having one end thereof associated with each of said bearing members to position the same longitudinally of said housing and extending rearwardly therefrom through said first mounting members;
      3. a detector bar element arranged to receive the other end of said rods and to move longitudinally therewith;
      4. means biasing said bar member longitudinally outwardly of said housing and away from said first mounting members;
      5. a detector cam on said detector bar element;
      6. a control switch arranged for actuation by said cam for control of the controllable drive mechanism of the conveyor; and,
      7. means for adjusting said connecting rods for initially shifting said transverse shaft and tension the conveying member and locating said cam with respect to said switch.

2. The structure set forth in claim 1 and said biasing means being arranged between said first mounting members and said bar element.

3. The structure set forth in claim 1 and housing means arranged on said first mounting means, said biasing means including compression springs received in said housing means and extending therefrom to said detector bar element for biasing thereof longitudinally outwardly from said housing and away from said first mounting members.

4. The structure set forth in claim 3 and a pair of bearing receiving members for receiving and retaining said shaft bearing members therein, said bearing receiving members being shiftable with respect to said housing of the unit.

5. The structure set forth in claim 4 and said connecting rods having at least selected threaded portions thereon, said bearing receiving members having threaded portions thereon whereby rotation of said rods will shift said bearing receiving members and said shaft.

6. The structure set forth in claim 5 and said connecting rods having stop portions thereon for limiting the travel of said bearing receiving members.

7. The structure set forth in claim 1 and said detector cam being arranged and constructed to actuate said switch means for control of the drive mechanism of the conveyor upon movement of the idler sprocket carrying shaft in either direction.

8. The structure set forth in claim 7 and said cam normally being located to permit movement in a first direction a greater distance than movement in a second direction before actuation of said switch.

* * * * *